(12) United States Patent
Stenstrom

(10) Patent No.: US 7,587,572 B1
(45) Date of Patent: Sep. 8, 2009

(54) METHOD AND SYSTEM FOR MANAGING PROCESS MEMORY CONFIGURED IN RESIZABLE UNCOMPRESSED AND COMPRESSED REGIONS

(75) Inventor: Per O. Stenstrom, Torslanda (SE)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/931,430

(22) Filed: Aug. 31, 2004

(51) Int. Cl.
*G06F 13/16* (2006.01)

(52) U.S. Cl. ...................................... 711/173
(58) Field of Classification Search ................... 711/173
See application file for complete search history.

(56) References Cited

U.S. PATENT DOCUMENTS 5,490,260 A * 2/1996 Miller et al. ................ 711/100
6,523,102 B1 * 2/2003 Dye et al. .................... 711/170
2001/0001872 A1 * 5/2001 Singh et al. .................. 711/129
2005/0097278 A1 * 5/2005 Hsu et al. .................... 711/129

* cited by examiner

*Primary Examiner*—Hyung S Sough
*Assistant Examiner*—Shawn Eland
(74) *Attorney, Agent, or Firm*—Martine Penilla & Gencarella, LLP

(57) ABSTRACT

A method for managing a computer system process memory allocated to execution of a process configured to use data stored to storage is provided. The process memory has a predetermined size and is filled by uncompressed pages of data necessary to execute the process being copied from the storage. The process memory is partitioned into an uncompressed region having an adjustable first size and a compressed region having an adjustable second size. The uncompressed region includes uncompressed pages of data and the compressed region includes compressed pages of data. The first size of the uncompressed region and the second size of the compressed region are adjusted when a requested page of data necessary for continuing the execution of the process resides in either the storage or the compressed region.

9 Claims, 6 Drawing Sheets

METHOD AND SYSTEM FOR MANAGING PROCESS MEMORY CONFIGURED IN RESIZABLE UNCOMPRESSED AND COMPRESSED REGIONS

BACKGROUND

1. Field of the Invention

This invention relates generally to computer system memory, and more particularly, to methods and systems for minimizing computer system active process memory access time by adaptively partitioning the active process memory into uncompressed and compressed regions.

2. Description of the Related Art

Today, the performance of a computer system processor greatly depends on the speed the processor accesses data in the memory. To reduce memory access time, many computer system architectures implement memory hierarchy architectures wherein most frequently accessed information is defined in the memory level that can be accessed most expeditiously. In the alternative, the desired information is defined in the next fastest memory portion. In this manner, each memory level of the memory hierarchy is searched in the descending order until the desired information is found. One component in such a memory hierarchy is a cache memory.

Cache memories can usually be accessed more rapidly than disks, and are used between processing devices and main memory. Relying on the principle of locality, cache memories are used to increase the likelihood of the processor finding the desired data in the cache memory. For instance, continually used data is preferably defined in the physical memory space so as to reduce latencies associated with accessing non-resident data. However, as software applications become larger and more complex, the need to allocate more physical memory space to each process has become more evident. Despite such need, allocating more physical memory space to active processes is disfavored because of the significant cost of physical memory.

One solution to increase an active process physical memory space is partitioning the active processor physical memory into fixed-size compressed and uncompressed regions. Typically, such partitioning of physical memory is achieved at the time the computer system memory is being designed. In such a scenario, so long as the necessary data (i.e., the process working set) is limited, the process working set can usually be located in the uncompressed region of the main memory. Latency, however, can be associated with accessing data in the compressed region of the process memory if the process workload is greater than the process working set residing in the uncompressed region. Using fixed-size uncompressed and compressed regions becomes even more problematic when running large processes. In such scenarios, unless the size of the uncompressed and compressed regions, together, is greater than or equal to the entire working set of the active process, the latency associated with accessing data in the disk can significantly lower performance.

A different solution is allowing the memory management unit (MMU) to partition the process memory to fixed-size uncompressed and compressed regions. In such a scenario, however, if the compressed region of the process memory is larger than the uncompressed region (i.e., compression is performed aggressively), significant compression latency can be experienced, as a considerable amount of data is stored in the compressed region. If the compressed region of the process memory is smaller (i.e., compression is not performed sufficiently), considerable disk latencies can be experienced. In either scenario, system performance can suffer.

In view of the foregoing, there is a need for systems and methods capable of improving the performance of an active process by minimizing memory access time.

SUMMARY

Embodiments of the present invention provide a method and a system capable of optimizing performance of an active process while minimizing memory access time through dynamically partitioning an active process main memory into resizable uncompressed and compressed regions. It should be appreciated that the present invention can be implemented in numerous ways, including as a process, an apparatus, a system, a device, or a method. Several inventive embodiments of the present invention are described below.

In one embodiment, a system for managing a computer system process memory allocated to an execution of a process configured to use data stored to a storage is provided. The process memory has a predetermined size and is filled by uncompressed pages of data necessary to execute the process wherein the uncompressed pages are copied from the storage. The system includes means for partitioning the process memory into an uncompressed region having a first size and a compressed region having a second size, and means for adjusting the first size of the uncompressed region and the second size of the compressed region. The first size and the second size are configured to be adjustable. The uncompressed region is configured to include uncompressed pages of data and the compressed region is configured to include compressed pages of data. The first size of the uncompressed region and the second size of the compressed region are adjusted when a requested page of data necessary for continuing the execution of the process resides in either the storage or the compressed region, and the first size of the uncompressed region cannot be increased.

In another embodiment, a method for managing a computer system process memory allocated to an execution of a process configured to use data stored to a storage is provided. The process memory has a predetermined size and is filled by uncompressed pages of data necessary to execute the process and the uncompressed pages are copied from the storage. The method includes partitioning the process memory into an uncompressed region having a first size and a compressed region having a second size. The first size and the second size are configured to be adjustable. The uncompressed region is configured to include uncompressed pages of data and the compressed region is configured to include compressed pages of data. The method also includes adjusting the first size of the uncompressed region and the second size of the compressed region when a requested page of data necessary for continuing the execution of the process resides in either the storage or the compressed region, and the first size of the uncompressed region cannot be increased.

In yet another embodiment, another method for dynamically partitioning a computer system process memory allocated to execution of a process using data stored to a storage so as to improve a performance of the process is provided. Data is stored to storage in a page frame format and the process memory is filled with page frames necessary to execute the process. The method includes the operations of (a) receiving a request for a page frame to continue execution of the process, (b) determining whether a requested page frame resides in the process memory; (c) partitioning the process memory into an uncompressed region that has a first size and a compressed region that has a second size wherein the first size and the second size are adjustable, (d) adjusting the first size of the uncompressed region and the second size of the compressed region so as to free adequate space for the requested page frame, (e) copying the requested page frame into the uncompressed region, (f) continuing execution of the process using the requested page frame, and (g) repeating the operations of (a) through (f) until execution of the process has concluded.

In still another embodiment, another method for dynamically partitioning a computer system process memory allocated to execution of a process using data stored to a storage is provided. Data is stored to storage in a page frame format and the process memory is configured to have a predetermined size. The method includes the operations of (a) commencing execution of the process, (b) receiving a request for a page frame to execute the process, (c) copying a requested page frame to the process memory if the requested page frame does not reside in the process memory, (d) repeating operations (b)-(c) until the process memory is filled, (e) partitioning the process memory to an uncompressed region having a first size and a compressed region having a second size wherein the first size and the second size are configured to be adjustable, (f) adjusting the first size of the uncompressed region and the second size of the compressed region so as to free adequate space in the uncompressed region for the requested page frame to be copied, (g) copying the requested page frame into the uncompressed region, (h) continuing execution of the process using the requested page frame, and (i) if a request for a new page frame is received and the new requested page frame does not reside in the uncompressed region, repeating the operations of (f) through (h) until execution of the process has concluded.

Other aspects of the invention will become apparent from the following detailed description, taken in conjunction with the accompanying drawings, illustrating by way of example the principles of the invention.

BRIEF DESCRIPTION OF THE DRAWINGS

The present invention may be understood by reference to the following description taken in conjunction with the accompanying drawings in which.

DETAILED DESCRIPTION

Inventions for minimizing memory access time while optimizing an active process performance are provided. Several exemplary embodiments of the invention will now be described in detail with reference to the accompanying drawings.

The embodiments of the present invention provide methods and systems for minimizing memory access time while optimizing active process performance using a memory management and replacement method. In one embodiment, a process main memory is dynamically partitioned into uncompressed and compressed regions, on demand, and at any given time. In one example, a miss rate in the uncompressed region of the process main memory and a page fault rate in the compressed region of the process main memory are monitored. According to one embodiment, the size of the uncompressed region and compressed region of the process main memory can be adjusted upon a miss in the uncompressed region and/or a page fault in the compressed region of the process main memory.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
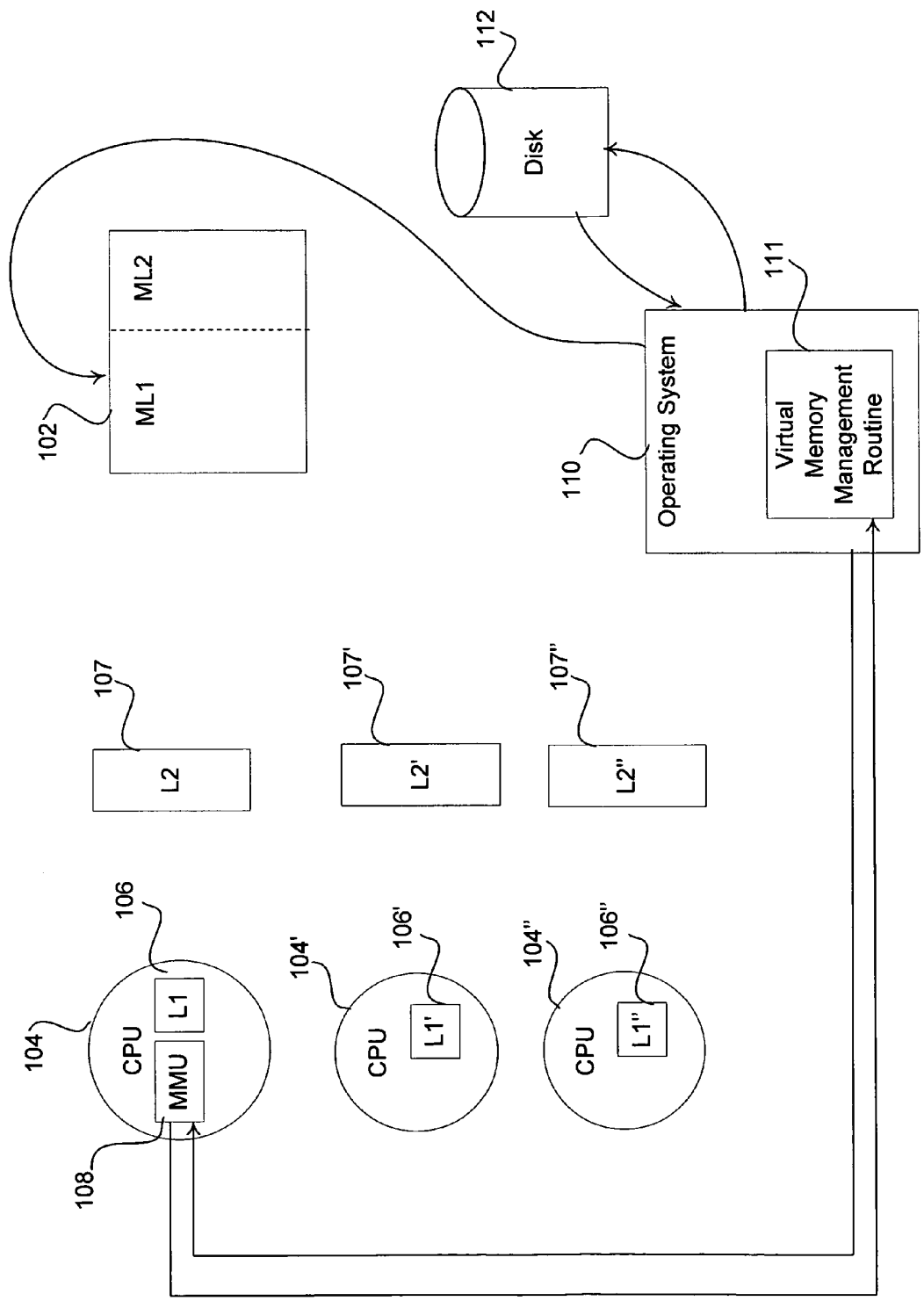
FIG. 1 is a simplified block diagram of an exemplary multiprocessor computer system wherein an active process main memory has been partitioned into a two-level memory cache, in accordance with one embodiment of the present invention.

FIG. 1 is a simplified block diagram of an exemplary multiprocessor computer system 100 wherein an active process main memory 102 has been partitioned into a two-level memory cache, in accordance with one embodiment of the present invention. In the embodiment illustrated in FIG. 1, the system 100 includes a plurality of processors 104, 104', and 104" sharing a main memory physical space 103. The process main memory 102 has been allocated to the active process currently being executed. An operating system 110 is configured to request and copy pages of memory necessary to execute the active process from a storage 112 to the process main memory 102. The process main memory 102 has been partitioned into an uncompressed region ML1 and a compressed region ML2. In accordance with one embodiment of the present invention, a size of the uncompressed region ML1 and a size of the compressed region ML2 can be adjusted dynamically at any point in time, as need arises, during the execution of the active process. Additional information with respect to the capability of the memory management and replacement method of the present invention to adjust the size of the compressed ML2 and uncompressed regions ML1 of the process main memory are provided below with respect to FIGS. 2-5.

In the embodiment shown in FIG. 1, the system 100 has cache memory built into the architecture of the processors as well as external cache memory. Specifically, the processors (e.g., control processing unit (CPU)) 104, 104', and 104", respectively, include level one cache memories 106, 106', and 106". The illustrated processors 104-104" also have external level 2 cache memories 107-107", respectively. As can be seen, the level 2 cache memories 107-107" are defined between the respective processor 104-104" and the main memory 103. Of course, one of ordinary skill in the art must appreciate that the embodiments of the present invention may implement any number of levels of cache.

In one example, virtual memory, as supported by the operating system 110, is used to enlarge the address space (i.e., the set of physical addresses in the process main memory 102) that can be used by the active process. Using the virtual memory, the operating system 110 can execute the active process by copying pages essential for the execution of the active process into the process main memory 102, at any given time, during execution of the active process.

At the outset, in one embodiment, each page of data is stored to the storage 112 until the page is needed and requested by the operating system 110. In one example, to facilitate copying of data into the process main memory 102, the operating system 110 has partitioned data in the storage 112 (i.e., virtual memory) into pages, with each page containing a fixed number of addresses. Each page is stored to the storage 112 until the page is needed for the execution of the active process. In this manner, the latency associated with accessing data from the storage 112 has been substantially eliminated. In one example, the storage 112 can be a disk. In another embodiment, the storage 112 can be any appropriate component capable of storing data (e.g., memory, random access memory (RAM), flash memory, hard disc, mini hard disc, etc.).

When necessary, the operating system 110 issues a request to a memory management unit (MMU) 108 defined in the processor 104. Of course, in a different embodiment, the MMU 108 maybe defined such that the MMU 108 can also be associated with processors 104' and 104". In one embodiment, the MMU 108 is a hardware component configured to manage the virtual memory system. However, in another embodiment, the MMU 108 can be a software component or any other appropriate component capable of managing the virtual memory system. The MMU 108 includes a small amount of memory that holds a Translation Look-aside Buffer (TLB) table, which matches substantially the most recent virtual addresses to the process main memory physical addresses. In another embodiment, the TLB can be defined between the processor 104 and the cache memory 106 or between any two cache levels (e.g., level one cache 106 and the external cache memory level two 107, etc.). In accordance with one embodiment, upon receiving the request for the desired page, the MMU 108 determines whether the desired page is in the process main memory 102 or whether the desired page is stored to the mass storage device 112. The MMU 108 can further distinguish between pages residing in the uncompressed region of the main memory 102 and the compressed region of the main memory 102. In this manner, the MMU 108 can be configured to detect a miss in the uncompressed region of the main memory 102.

In the event the desired page cannot be located in the process main memory 102, the MMU 108 issues a page fault request to the operating system 110. At this point, the operating system 110 copies the desired page from the storage 112 to the process main memory 102. While being copied, the virtual address of the page is translated into real address in the process main memory 102 (i.e., the addresses from virtual addresses are mapped to corresponding real addresses). In this manner, the memory management and replacement method of the present invention can be used to accommodate an active process which execution requires the presence of multiple pages in the process main memory without latencies associated with accessing data in the storage 112. It must be appreciated that latency associated with accessing compressed data is less than the latency associated with accessing data in the disk. For instance, while accessing data in the uncompressed region can be about 100 ns, the latency associated with accessing data in the compressed region can be in the order of two magnitude (i.e., about $10^4$ ns), while the latency associated with accessing data in the disk can be in the order of six (6) magnitude (i.e., about $10^7$ ns).

Figure 2:
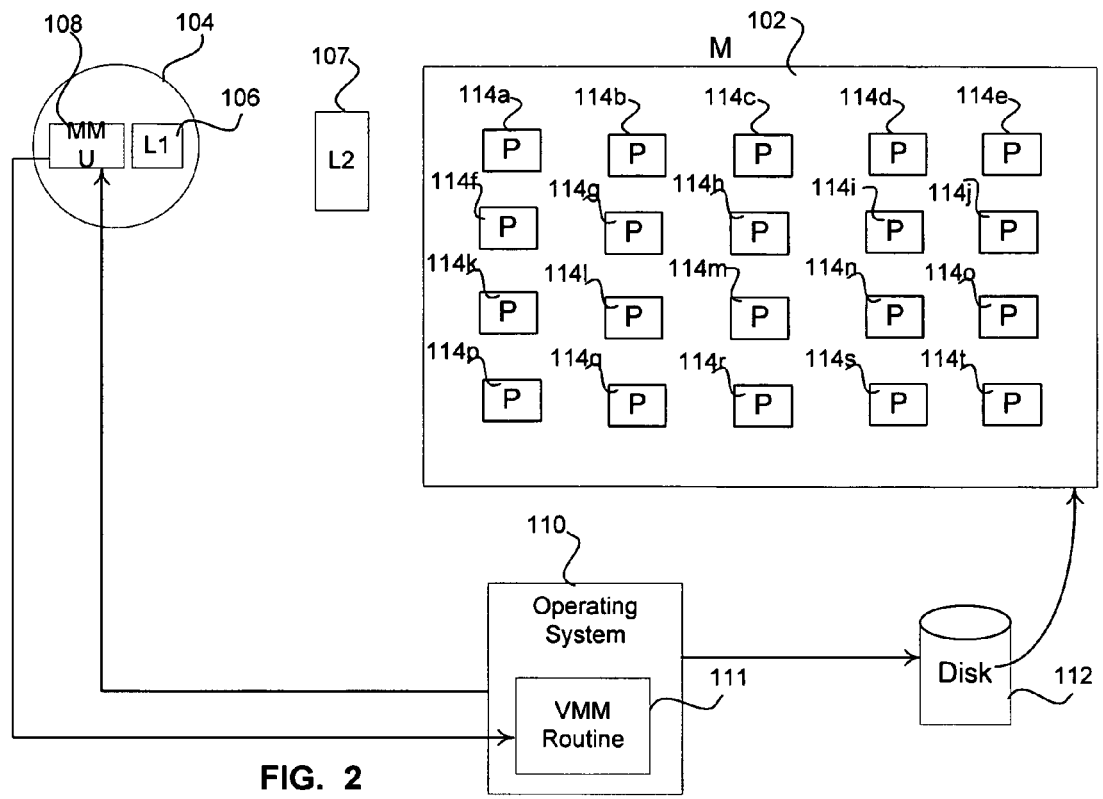
FIG. 2 is a simplified block diagram illustrating copying of pages necessary to execute the active process into the process main memory, in accordance with one embodiment of the present invention.

Reference is made to the simplified block diagram shown in FIG. 2 illustrating copying of pages necessary to execute the active process into the process main memory 102, according to one embodiment of the present invention. In the illustrated embodiment, the operating system 110 starts execution of the active process by requesting pages necessary to run the active process. As the need arises during the execution of the active process, each memory access causes a request to be dispatched to the MMU 108. Upon receiving the request, the MMU 108 determines whether the requested page resides in the process main memory 102 (i.e., RAM) or has to be fetched from the storage 112. In one embodiment, the MMU 108 uses the TLB to determine whether the requested page is in the process main memory 102.

In the illustrated embodiment, being the onset of the active process execution, the process main memory 102 may not include any of the necessary pages. As such, the necessary pages are requested and copied into the process main memory 102, as the need arises. By way of example, the process requests a page 114a from the MMU 108. At this point, the MMU 108 first checks the TLB table, concluding that the requested page 114a does not reside in the process main memory 102. Thereafter, the MMU 108 sends a request to the virtual memory management (VMM) routine 111 defined in the operating system 110. Once the VMM routine 111 then concludes that the page does not reside in the process main memory 102, the VMM routine 111 issues a page fault request to the operating system 110. The page fault request signals to the operating system 110 that the desired page 114a has to be fetched from the virtual memory, storage 112, and be loaded into the process main memory 102. At this point, as the process main memory 102 has free space, the page 114a is loaded into the process main memory 102. Thus, at this point, the process main memory 102 has not yet been partitioned into the uncompressed and compressed regions.

Following the same pattern, the operating system 110 requests page 114b from the MMU 108, as the need arises. Upon receiving the request, the MMU 108 checks the TLB table and consults the VMM routine 111 so as to determine whether the page 114b is in the process main memory 102. As the page 114b does not reside in the process main memory 102, the VMM routine 111 issues a page fault request to the operating system 110. At this point, if a determination is made that free space still exists in the process main memory 102, the operating system 110 fetches the desired page 114b from storage 112 (e.g., the virtual memory), and loads the page 114b into the process main memory 102. In this manner, as the need arises, each page 114c through 114t is copied into the process main memory 102 so long as the process main memory 102 has free space. In the illustrated embodiment, once page 114t has been copied into the process main memory 102, the process main memory 102 is filled.

Figure 3:
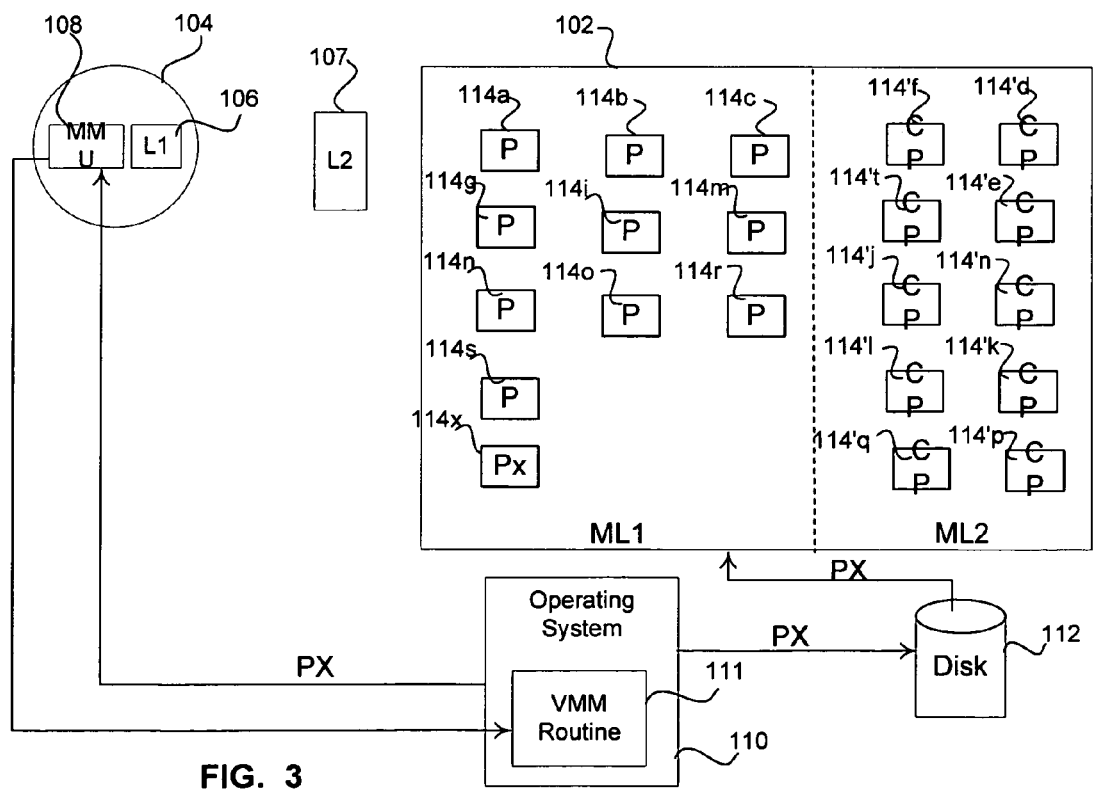
FIG. 3 is a simplified block diagram illustrating dynamic partitioning of the process main memory into an uncompressed region and a compressed region, in accordance with one embodiment of the present invention.

Proceeding to FIG. 3, dynamically partitioning the process main memory 102 into an uncompressed region ML1 and a compressed region ML2 can further be understood, in accordance with one embodiment of the present invention. Executing the process continues with the process requesting access to the page Px 114x to determine whether the page Px 114x already resides in the process main memory 102, the MMU 108 searches through the TLB table looking for the page Px 114x. As the TLB has no entry for the page Px 114x, the MMU 108 thereafter consults the VMM routine 111. Once the VMM routine 111 concludes that page Px 114x does not reside in the process main memory 102, the VMM routine 111 issues a page fault request to the operating system 110 signaling the absence of the page Px 114x in the process main memory 102. At this point, for the execution of the active process to proceed, the operating system 110 has to fetch and copy the page Px 114x into the process main memory 102. However, before the page Px 114x can be copied into the process main memory 102, a determination has to be made as to whether the process main memory 102 has sufficient free space to be allocated to the page Px 114x. In the embodiment shown in FIG. 3, however, the process main memory 102 is filled. Additionally, the page fault rate M2 is greater than the page fault threshold P-TH, indicating that the active process is in need of more memory space. At this point, the active process main memory may be partitioned into the uncompressed and compressed regions.

According to one example, the memory management and replacement method of the present invention keeps track of the active process main memory 102 access time, thus allowing data residing in the process main memory 102 to be compressed, as aggressively as possible, without hurting main memory performance. In one embodiment, the memory management and replacement method can estimate memory access time using the exemplary equation provided in Table 1.

TABLE 1

Exemplary Equation to Determine Average Memory Access Time $TM = (1 - M1) \times TM1 + (M1 - M2) \times TM2 + M2 \times TD$
Wherein,
| TM: | Average Memory Access Time |
| TM1: | Memory Level 1 Access Time (Uncompressed region) |
| TM2: | Memory Level 2 Access Time (Compressed region) |
| M1: | Miss Rate in ML1 |
| M2: | Page Fault Rate in ML2 |
| TD: | Disk Access Time |
| TM2: | Decompression Latency associated with decompressing a page in ML2 |
| TM1: | Normal Average Access Time |

The latter equation expresses the average main memory access time to a process main memory 102 having a two-level memory hierarchy ML1 and ML2. M1 represents the miss rate in ML1, herein being defined as a fraction of all process main memory accesses hitting the process main memory 102 seeking a specific page not residing in the uncompressed region ML1 of the process main memory 102. M2 represents the page fault rate, herein being defined as a fraction of all process main memory accesses seeking a page not residing in either the uncompressed region ML1 or the compressed region ML2 of the process main memory 102. According to one example, the uncompressed region ML1 is being treated as a level-1 memory cache. However, one of ordinary skill in the art must appreciate that an inclusion does not exist between the uncompressed region ML1 and the compressed region ML2. That is, a page that resides in the uncompressed region ML1 does not reside in the compressed region ML2 and, vice versa. As such, in contrast to the prior art wherein average main memory access time is measured when a page fault request is generated, in the present invention, to determine the average process main memory access time, the cache miss rate in the uncompressed region ML1 (i.e., level-1 memory cache) as well as the page fault rate in the compressed region ML2 (i.e., level-2 memory cache) are considered.

In one embodiment, prior to compressing data in a page, a compression ratio CR of the page is compared with a compression ratio threshold (CR-TH). As used herein, the compression ratio CR is defined as the size of a particular page, as compressed, over the size of the particular page, as uncompressed. For instance, if the size of the particular page as compressed is "$\alpha$" and the size of the particular page as uncompressed is "$\beta$," the compression ratio CR is calculated to be "$\alpha/\beta$." In this manner, in one example, a page can be compressed so as to occupy "$\alpha/\beta$" space of the original space initially occupied by the page. For instance, assuming that the size of the compressed page is 90 bytes and the size of the page as uncompressed is 100 bytes, the compression ratio CR is 90/100 (or 9/10). In such a scenario, a page can be compressed so as to occupy 0.9 space of the original space occupied by the page. In the latter example, to free up enough space for a new page (i.e., an uncompressed page), about ten (10) pages are required to be compressed so that the new page can be copied into the uncompressed region ML1.

According to one aspect, the compression threshold CR-TH can be selected so as to prevent the compression ratio CR from exceeding a particular rate. For instance, in one embodiment, a default value can be assigned to the compression threshold CR-TH. However, the selected compression threshold CR-TH should not be very high, as when the compression threshold CR-TH is very high, to create enough free space, a large number of pages should be compressed. However, one of ordinary skill in the art must appreciate that depending on the application and the active process, the compression ratio CR may be selected as desired. According to one example, the compression ratio CR can be determined by merely compressing a plurality of pages and thereafter determining the compression ratio CR by dividing the size of a compressed page with the size the page occupies when the page is not compressed. In another example, the compression ratio CR can be history based. That is, the compression ratio CR can be determined using the history of the previous page compressions or a series of prior page compressions. In one example, the compression ratio CR can be selected to be about 0.5. That is, each page can be compressed so as to occupy approximately about one half or less of the size of the page as uncompressed.

In accordance with one embodiment, an exemplary description of the memory management and replacement method of the present invention is shown in Table 2.

TABLE 2

Exemplary Description of an exemplary Memory Management and Replacement Method

Miss in ML1:
if (Hit in ML2) then decompress page
Miss in ML2:
if (free_pages)
  then allocate_new_page_frame
  else if (page_fault_rate > P - TH) / Try to compress more pages /

TABLE 2-continued

Exemplary Description of an exemplary Memory Management and Replacement Method

```
    then if (M1 < M1 – TH)
        then if ( CR < CR – TH && enough pages to compress)
            then {
                select [1/(1 – CR)] victims in ML1;
                compress selected victims;
            }
            else
                request more process memory from VMM
        else
            request more process memory from VMM
    else if (M1 < M1 – TH) /** Victimize pages in ML1**/
        then if ( CR < CR – TH && enough pages to compress)
            then {
                select [1/(1 – CR)] victims in ML1;
                compress selected victims;
                victimize sufficient number of pages in ML2
            }
            else
                victimize sufficient number of pages in ML1 and/or ML2
        else if (at least [1/(1 – CR)] pages in ML2 can be victimized)
            then
                victimize sufficient number of pages in ML2
            else
                request more process memory from VMM
```

In one embodiment, the pages to be victimized can be determined using a replacement method. In on example, the replacement method can be least recently used (LRU) while in another example, the replacement method can be any other appropriate replacement method (e.g., FIFO, random, etc.).

Thus, the memory management and replacement method of the present invention considers the miss rate in the uncompressed region ML1 (i.e., level-1 memory cache) as well as any page fault request in the compressed region ML2 (i.e., level-2 memory cache) to determine the average process main memory access time. Additional information with respect to using the miss rate in the uncompressed region ML1 and the page fault rate in the compressed region ML2 to minimize memory access time is provided below with respect to FIGS. 4 and 5.

With continued reference to FIG. 3, to copy the page Px into the process main memory 102, the memory management and replacement method of the present invention has partitioned the process main memory 102 by creating the compressed region ML2. Furthermore, the miss rate in ML1 is lower than a preset threshold M1-TH indicating that the size of ML1 is sufficiently large to keep the working set of the process. In the illustrated embodiment, the compression ratio CR is below the CR-TH. Thus, the memory management and replacement method of the present invention has compressed 1/(1-CR) number of pages in the uncompressed region ML1. According to one example, the pages to be compressed can be the least recently used pages. In the embodiment shown in FIG. 3, pages 114$f$, 114$d$, 114$e$, 114$t$, 114$h$, 114$j$, 114$k$, 114l, 114$p$, and 114$q$ are compressed. Once compressing of pages 114$f$, 114$d$, 114$e$, 114$t$, 114$h$, 114$j$, 114$k$, 114l, 114$p$, and 114$q$ has concluded, the operating system 110 retrieves the page Px 114$x$ from the storage 112 and copies same into the uncompressed region ML1. In this manner, the size of the compressed region ML2 of the process main memory 102 is increased while adequate space is freed in the uncompressed region ML1 of the process main memory 102 for the page Px to be copied. Thus, the memory management and replacement method of the present invention allows on-the-fly partitioning of the process main memory into resizable uncompressed and compressed regions so as to minimize memory access time.

Figure 4:
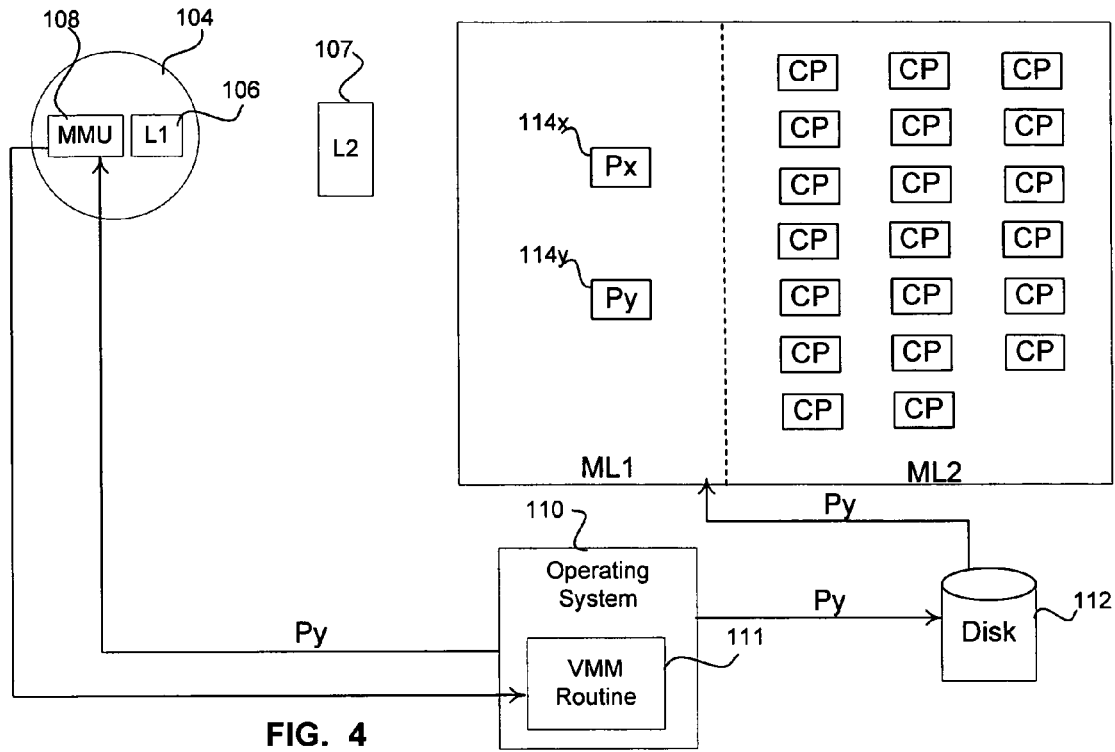
FIG. 4 shows a simplified block diagram illustrating adjusting the size of the uncompressed region and compressed region of the process main memory dynamically so that execution of the active process can be continued, in accordance with one embodiment of the present invention.

Proceeding to the simplified block diagram shown in FIG. 4, dynamically adjusting the size of the uncompressed region ML1 and compressed region ML2 to continue execution of the active process can further be understood, in accordance with one embodiment of the present invention. To proceed with execution of the active process, data in page Py has to be resident in the process main memory 102. As shown, the operating system 110 has requested page Py by dispatching a request to the MMU 108. At this point, the MMU 108 searches through the TLB table so as to check whether the page Py 114$y$ already resides in the process main memory 102.

According to one example, as the process main memory 102 has been partitioned to uncompressed and compressed regions ML1 and ML2, respectively, in the illustrated embodiment, a cache miss is issued by the VMM routine 111 revealing that the page Py is not in the uncompressed region ML1. In one example, the cache miss is configured to update the ML1 miss rate counter. A page fault is also issued by the VMM routine 111, signaling to the operating system 110 that the page Py does not currently reside in the process main memory 102 (i.e., in the compressed region ML2). Thus, to continue with execution of the active process, the operating system 110 has to fetch the page Py from the storage 112 and copy the page Py into the process main memory 102. However, for the page Py to be copied into the process main memory 102, the operating system 110 should first establish that the process main memory 102 has sufficient free space that can be allocated to the page Py.

According to one embodiment, the ML1 miss rate counter can be used to make an inference that the size of the uncompressed region ML1 may be too small and that the performance of the memory level-1 cache is at a low level. At such point, a decision has to be made as to whether any additional main memory space can be allocated to the active process. In the illustrated embodiment, however, additional space cannot be allocated to the active process. Furthermore, if the page fault rate is higher than the preset page fault threshold (P-TH), the page fault rate can be an indication that the space allocated to the process is too small. At such point, the operating system 110 may be asked to free up more main memory resources. Conversely, if the page fault rate is lower than the preset page fault threshold, the replacement method will attempt to free up space in the process main memory 102 by victimizing a sufficient number of pages in the compressed region ML2. According to one embodiment, pages to be victimized may be selected among the least recently used pages. In another embodiment, however, the pages to be victimized can be selected using any appropriate replacement method.

However, if the page fault rate M2 is lower than the page fault threshold P-TH and the ML1 miss rate is lower than the ML1 miss rate threshold M1-TH (i.e., a performance problem does not exist), the active process has enough pages in the process main memory 102 for the active process to be executed. Thereafter, in accordance with one embodiment of the present invention, the memory management and replacement algorithm of the present invention initially opts for moving pages from the uncompressed region ML1 to the compressed region ML2. For instance, least recently used pages of data can be compressed as aggressively as possible using the memory management and replacement method of the present invention while having minimal effect on process main memory access time. In addition, in one example, because enough memory has been allocated to the active process, the least recently used pages in ML2 can be victimized.

Figure 5:
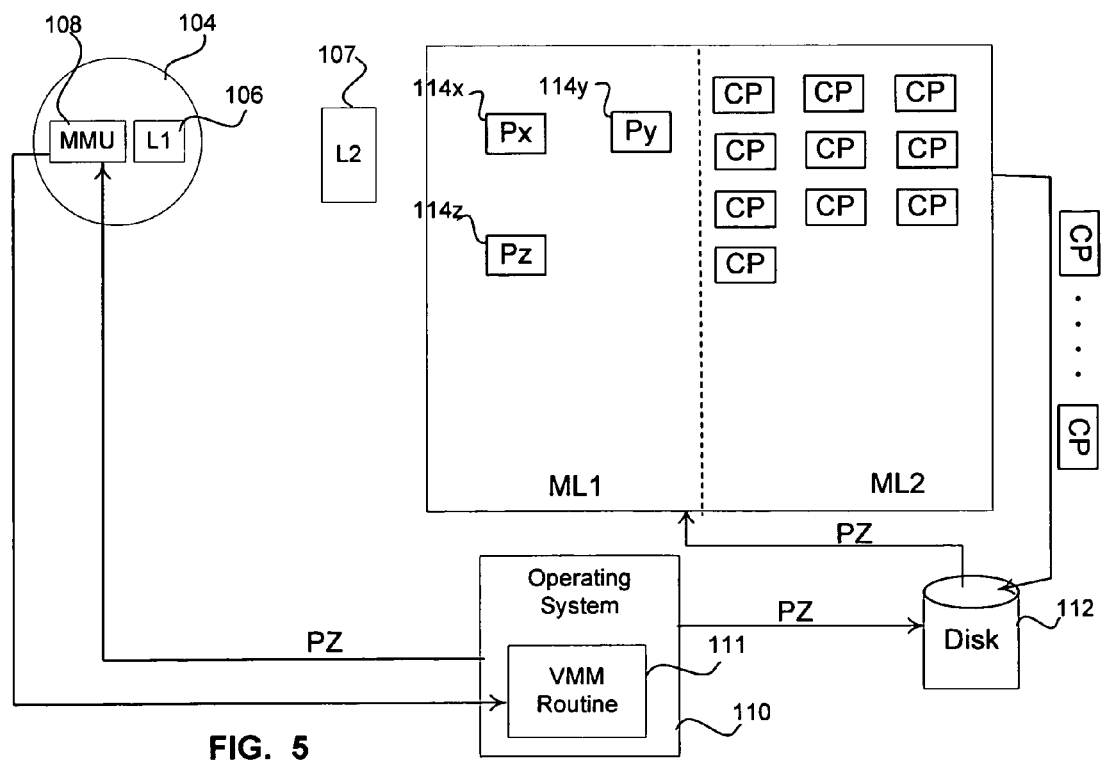
FIG. 5 is a simplified block diagram illustrating paging out of data from the compressed region into the storage, in accordance with yet another embodiment of the present invention.

Reference is made to the simplified block diagram of FIG. 5, illustrating performance level of the memory management and replacement method of the present invention when the cache miss rate is greater than the cache miss rate threshold M1-TH and the page fault rate is greater than the page fault threshold P-TH, according to one embodiment. As can be seen, the VMM routine 111 is invoked so as to determine whether the page Pz is in the uncompressed region ML1 of the process main memory 102. At this point, a miss in ML1 is generated as page Pz does not reside in the uncompressed region ML1. Thereafter, a page fault is also generated as the page Pz does not reside in the compressed region ML2.

According to one example, when the miss rate in ML1 is greater than the miss rate threshold M1-TH, an inference can be made that the level of memory performance is lower than the desired level and that too many ML1 misses are being experienced. As such, the number of pages in the uncompressed region ML1 may not be victimized in favor of the compressed portion ML2. By way of example, the pages residing in the uncompressed region ML1 should remain uncompressed in the uncompressed region of the memory (i.e., the size of the uncompressed portion ML1 cannot be reduced by compressing a number of pages in ML1 in favor of increasing the size of the compressed portion ML2). At such point, free space can be claimed from the compressed portion ML2 by swapping a number of pages residing in the compressed region ML2 to the storage 112 (i.e., victimizing, for instance, the least recently used pages in the compressed region ML2). In such a scenario, if the size of compressed region ML2 is greater than the 1/(1-CR)), 1/(1-CR) number of the compressed pages from the compressed region ML2 are swapped to the storage 112, thus freeing up space in the process main memory 102 for a single page. However, if 1/(1-CR) number of compressed pages cannot be found in the compressed region ML2, any number of compressed pages in the compressed region ML2 may be swapped to the storage 112. If after all the pages in the compressed region ML2 have been swapped to the storage 112 still not enough free space exists in the process main memory 102 to execute the active process, a page from the uncompressed region ML1 is swapped out to the storage 112. Alternatively, more memory space can be requested from the operating system 110.

In another embodiment, if the page fault rate is lower than the page fault threshold P-TH (i.e., a performance problem does not exist), the active process has enough pages in the process main memory 102 for the active process to be executed. However, in one example, all pages needed could be compressed in the compressed region ML2. At this point, a determination is made as to whether the cache miss rate M1 is greater than miss rate threshold M1-TH. If the miss rate is greater than the miss rate threshold M1-TH (i.e., the rate of allowed cache misses), the size of the uncompressed region ML1 is too small, and thus a performance problem exists. However, if the number of cache misses is less than the cache miss threshold M1-TH, a performance problem does not exist exit. At this point, the relative size of ML1 and ML2 should not be changed and sufficient number of pages from ML1 should be compressed so as to make adequate room for the new page. Additionally, in one example, the active main memory space consumed by the compressed pages is claimed by victimizing a sufficient number of pages in ML2. In both scenarios, in one example, the pages selected to be victimized could be the least recently used pages in ML1 and ML2. In another embodiment, any number of appropriate replacement methods may be used to select and victimize pages.

As can be appreciated, the memory management and replacement method of the present invention dynamically resizes the uncompressed and compressed regions of the process main memory if the page fault rate is greater than the page fault threshold or if the miss rate in the uncompressed region is less than the miss rate threshold. Furthermore, as the algorithm resizes the uncompressed and compressed regions of the active process main memory upon a miss in the uncompressed region, the algorithm can substantially quickly respond to changes in access behavior and thus maintain a robust memory system performance.

With continued reference to FIG. 5, in the illustrated embodiment, the page fault rate M2 is greater than page fault threshold P-TH 42 because a large number of requests have been made for pages that cannot be located in the process main memory 102. At this point, because additional memory space cannot be allocated to the active process, a determination is made as to whether the cache misses are greater than the number of allowed cache misses. In the embodiment shown in FIG. 5, the cache misses are greater than the allowed number of cache misses, thus causing a number of least recently used pages in the compressed region ML2 to be swapped from the compressed region ML2 of the process main memory 102 to the storage 112. One of ordinary skill in the art must appreciate that the number of compressed pages being swapped to storage 112 are at the minimum such that enough memory is freed in the main memory so that a page Pz 114z can be copied from the storage 112 to the uncompressed region ML1 of the main memory. In one example, the victimized pages can be decompressed prior to being written to disk. In another example, if a determination is made that the active process has not been allocated adequate amount of main memory, a request can be made to the operating system 110 for additional main memory space.

In this manner, by first swapping out least recently used pages from the compressed region ML2 of the process main memory 102, the memory management and replacement method of the present invention can dynamically adjust the size of the uncompressed region ML1 and compressed region ML2 such that the latency associated with swapping of pages between the process main memory 102 and the storage 112 is minimized. Specifically, the latency associated with decompressing a compressed page in the compressed region ML2 is less than the latency associated with swapping the page between the process main memory 102 and the storage 112. As a result, execution of the active process can be improved significantly because, for instance, accessing a byte of data in the process main memory 102 can be thousands of times faster than accessing a byte of data in the storage 112.

Figure 6A:
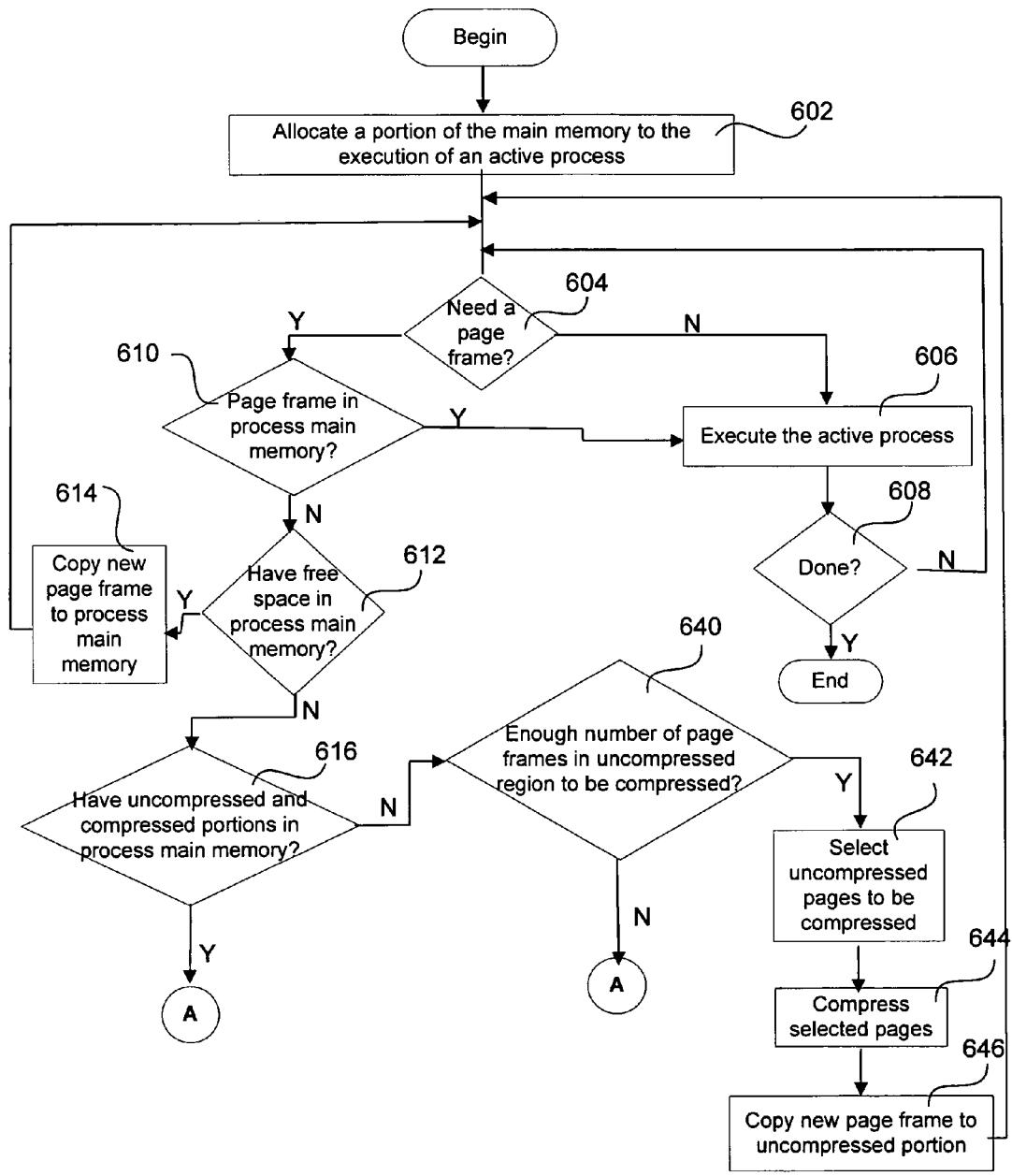
FIG. 6A depicts a flowchart diagram of method operations performed by the memory management and replacement method of the present invention to dynamically adjust the size of compressed and uncompressed regions of a process main memory, in accordance with yet another embodiment of the present invention.
Figure 6B:
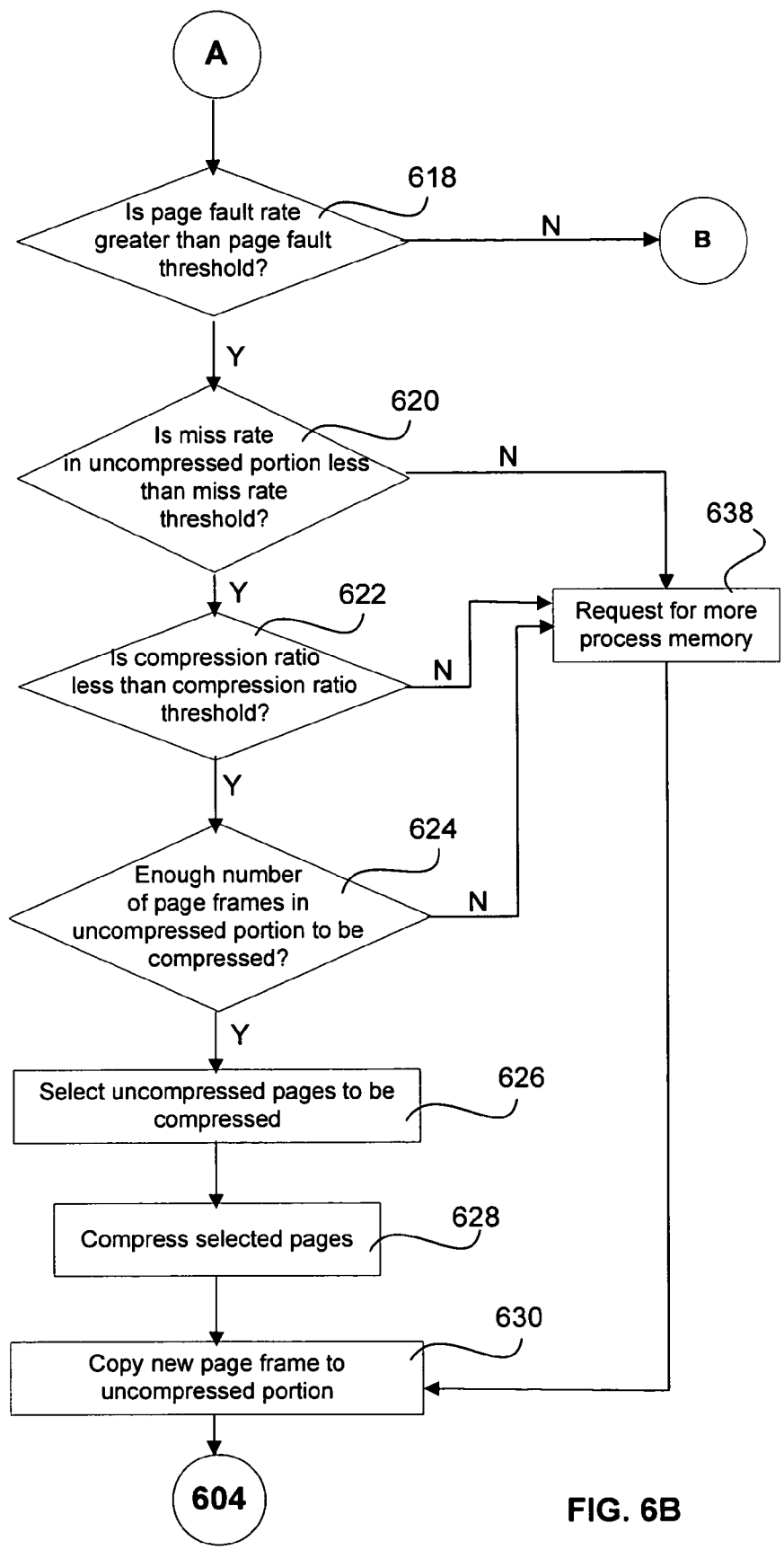
FIG. 6B depicts a flowchart diagram of method operations performed by the memory management and replacement method of the present invention to dynamically adjust the size of compressed and uncompressed regions of a process main memory, in accordance with yet another embodiment of the present invention.
Figure 6C:
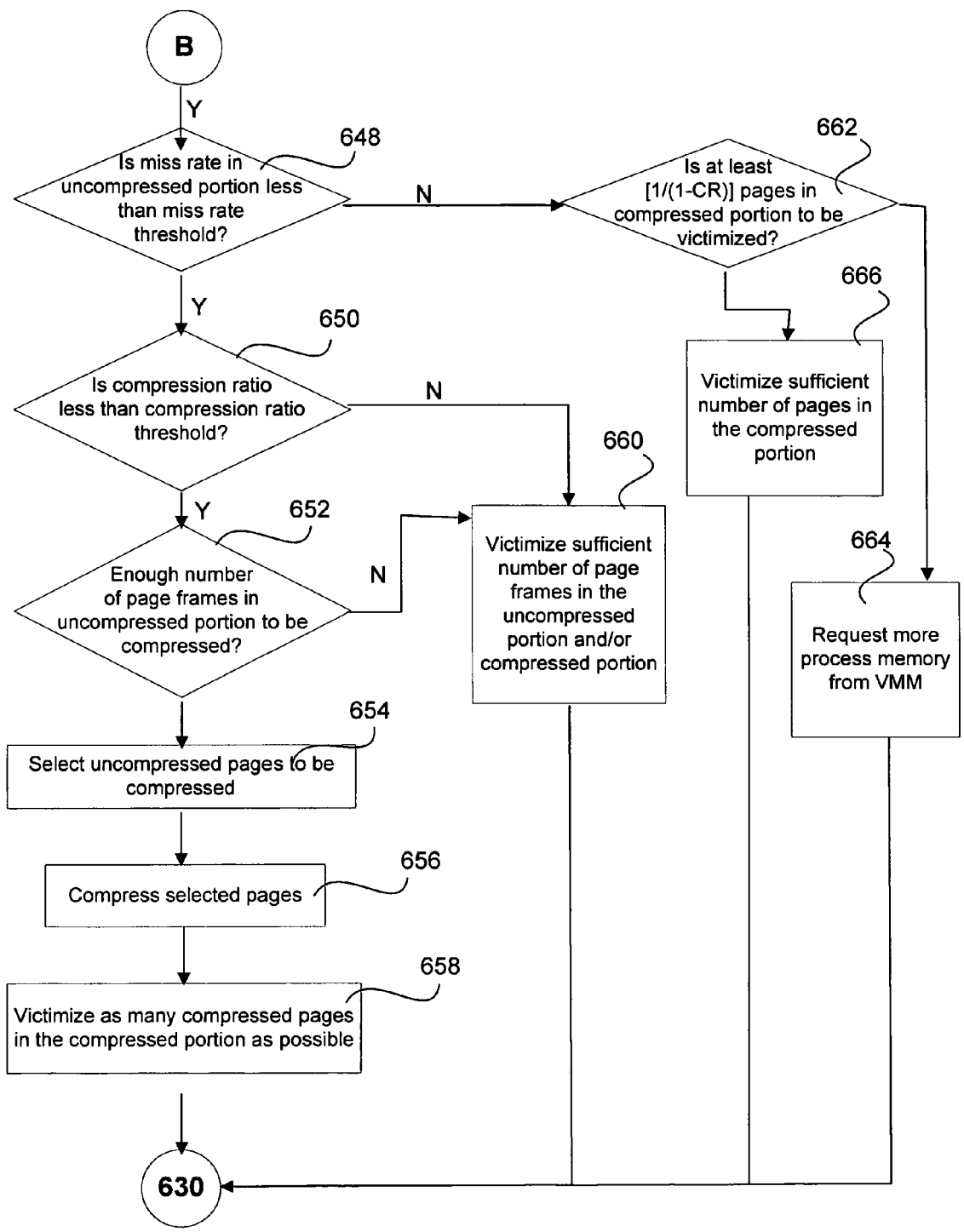
FIG. 6C depicts a flowchart diagram of method operations performed by the memory management and replacement method of the present invention to dynamically adjust the size of compressed and uncompressed regions of a process main memory, in accordance with yet another embodiment of the present invention.

Reference is made to the flow chart diagrams depicted in FIGS. 6A-6C illustrating the method operations performed by the memory management and replacement method of the present invention to dynamically adjust the size of compressed and uncompressed portions of a process main memory, in accordance with one embodiment of the present invention. The method begins in operation 602 in which a portion of the main memory is allocated to execution of an active process. In one example, multiple processes may be running almost at the same time, with each process having been allocated a specific portion of the main memory.

The method then continues to operation 604 in which a determination is made as to whether a page frame is required for the active process to be executed. If a page frame is not needed, the method continues to operation 606 in which the active process is executed using page frames residing in the active process main memory. Thereafter, in operation 608 a determination is made as to whether execution of the active process has concluded. At this point, the method continues to operation 604 if execution of the active process has not completed yet.

However, if in operation 604 a determination is made that execution of the active process needs a page frame, the method continues to operation 610. At this point, a determination is made as to whether the necessary page frame resides in a portion of the main memory allocated to the active process (i.e., process main memory). If the page frame is in the process main memory, the method continues to operation 606 in which the active process is executed.

If in operation 610 a determination is made that the page frame does not reside in the process main memory, the method continues to operation 612 wherein a decision is made as to whether the process main memory has enough free space for the page frame to be copied. If the process main memory has sufficient space, the method continues to operation 614 in which the new page frame is copied into the process main memory. Thereafter, the method continues to operation 604 so that execution of the active process can continue.

However, if in operation 612 a determination is made that the process main memory does not have sufficient memory space for the page frame, the method continues to operation 616 in which a determination is made as to whether the process main memory has an uncompressed portion and a compressed portion. The method continues to operation 640 if the process main memory does not have uncompressed and compressed portions. At this point, a determination is made as to whether enough number of page frames are defined in the uncompressed portion that upon compression, provide adequate space in the uncompressed portion for a new page frame to be copied. If the required number of page frames can be located in the uncompressed portion, the method continues to operation 642 in which the uncompressed page frames to be compressed are selected followed by the operation 644 wherein the selected page frames are compressed. At this point, the new page frame can be copied into the uncompressed portion of the process main memory in operation 646. However, if the number of page frames in the uncompressed portion is not enough, the method continues to "A."

If the process main memory has compressed and uncompressed portions, the method continues to "A," as depicted in FIG. 6B, wherein in operation 618, a determination is made as to whether the page fault rate is greater than the page fault threshold. If the page fault rate is less than the page fault rate threshold, the method continues to "B," otherwise, the method continues to operation 620. In the latter operation, a determination is made as to whether the miss rate in the uncompressed portion is less than the miss rate threshold. Thereafter, if the miss rate in the compressed portion is greater than the miss rate threshold, the method continues to operation 638 wherein a request is made for additional process memory.

If a determination is made that the miss rate in the uncompressed portion is less than the miss rate threshold, the method continues to operation 622 in which a determination is made as to whether the compression ratio is less than the compression ratio threshold. At this point, if the compression ratio is greater than the compression ratio threshold, the method continues to operation 638 wherein a request is made for more process main memory followed by copying the new page frame to the uncompressed portion in operation 630. If the compression ratio is less than the compression ratio threshold, the method continues to operation 624. In the latter operation, a determination is made as to whether enough number of uncompressed page frames resides in the uncompressed portion of the process main memory that can be compressed so as to release sufficient amount of space in the uncompressed portion for the new page frame to be copied. If not enough page frames reside in the uncompressed portion, the method continues to operation 638 wherein additional process main memory is requested.

However, if the number of page frames is enough, the method continues to operation 626 in which the uncompressed page frames to be compressed are selected. In one example, least recently used page frames are compressed. Thereafter, the method continues to operation 628 in which the selected page frames are compressed followed by the operation 630 wherein the new page frame is copied to the uncompressed portion.

If in operation 618 a determination is made that the page fault rate is less than the page fault threshold, the method continues to "B," wherein a determination is made as to whether the miss rate in the uncompressed portion is less than the miss rate threshold. If the miss rate in the uncompressed portion is greater than the miss rate threshold, the method continues to operation 662 wherein a determination is made as to whether the compressed portion includes enough number of page frames (e.g., 1/(1-CR) to be victimized. If enough number of pages can be located, the method continues to operation 666 wherein sufficient number of page frames in the compressed portion are victimized and sent back to storage. Otherwise, the method continues to operation 664 wherein additional process main memory is requested subsequent to which the method continues to operation 630.

If in operation 648 a determination is made that the miss rate in the uncompressed portion is less than the miss rate threshold, the method continues to operation 650 wherein a decision is made as to whether the compression ratio is less than the compression ratio threshold. If the compression ratio is greater, the method continues to operation 660 wherein sufficient number of page frames in the uncompressed portion and/or compressed portion is victimized. Alternatively, the method continues to operation 652 wherein a determination is made as to whether enough number of uncompressed page frames reside in the uncompressed portion of the process main memory that can be compressed so as to free sufficient amount of space in the uncompressed portion for the new page frame to be copied. If the number of pages residing in the uncompressed portion is not enough, the method continues to operation 660. Otherwise, the method continues to operation 654 wherein the uncompressed pages to be compressed are selected followed by operation 656 wherein the selected pages are compressed. Thereafter, the method continues to operation 658 wherein as many compressed pages as possible in the compressed portion are victimized so as to accommodate the new compressed page generated in the operation 656.

It must be noted by one of ordinary skill in the art that the memory management and replacement method of present invention can be implemented in any computer system configuration (e.g., hand-held devices, microprocessor systems, microprocessor-based or programmable consumer electronics, minicomputers, mainframe computers, etc.) and devices (e.g., embedded mobile devices (e.g., a PDA, a mobile phone, etc.), etc.). It must further be noted that in the embodiments of the present invention, data can be stored to any appropriate data storage (e.g., memory, random access memory (RAM), flash memory, hard disc, mini hard disc, etc.).

The aspects of the present invention are numerous. Most importantly, the embodiments of the present invention allow dynamic resizing of compressed and uncompressed portions of the process main memory so as to minimize process main memory access time. Another aspect of the memory management and replacement method of the present invention is that in contrast to the prior art wherein average main memory access time is measured when a page fault request is generated, in the present invention, determining the average process main memory access time considers both the cache miss rate in the uncompressed portion (i.e., level-1 memory cache) as well as the issuance of any page fault request in the compressed portion (i.e., level-2 memory cache). Still another aspect is that the memory management and replacement algorithm of the present invention initially opts for moving pages from the uncompressed portion to the compressed portion rather than swapping pages to the disk, thus avoiding latency associated with accessing data in the disk.

Although specific references may have been made to terminology defined by Sun Microsystems, Inc., it should be understood that any name could be used for such terms, so long as the desired functionality is achieved. For instance, the underlying environment for the method of the present invention can be any appropriate environment, on any device, and can be run on any operating system. Additionally, the embodiments of the present invention can be implemented in any computer system configurations including hand-held devices, microprocessor systems, microprocessor-based or programmable consumer electronics, minicomputers, mainframe computers and the like. The operating system can support any communication protocol, including protocols for downloading application files. Accordingly, any reference to a particular standard should be viewed only as exemplary and focus should be placed on the claimed functional operation.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention can be implemented using Java programming language, other programming languages may be used to implement the embodiments of the present invention (e.g., C, $C_{++}$, any object oriented programming language, etc.). Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for managing a computer system process memory allocated to an execution of a process configured to use data stored to a storage, the process memory having a predetermined size and comprising an uncompressed region having a first size and a compressed region having a second size, the first size and the second size configured to be adjustable, the uncompressed region being configured to include uncompressed pages of data and the compressed region being configured to include compressed pages of data, the process memory being filled by uncompressed pages of data necessary to execute the process, the system comprising the following instructions stored in main memory of the computer system for managing the process memory allocated to execution of the process:

a first instruction for determining whether a page fault rate of the process memory allocated to the execution of the process exceeds a page fault threshold, the page fault rate representing a fraction of all process memory accesses seeking a page of data, wherein the page of data does not reside in either the uncompressed region or the compressed region of the process memory, the page fault threshold being a preset reference with respect to the page fault rate;

a second instruction effective if the page fault rate exceeds the page fault threshold, the second instruction determining whether a miss rate in the uncompressed region is less than a miss rate threshold, the miss rate being a fraction of all process memory accesses to the process memory seeking a specific page not residing in the uncompressed region of the process memory, the miss rate threshold being a preset reference with respect to the miss rate;

a third instruction effective if the miss rate is less than the miss rate threshold, the third instruction reducing the first size of the uncompressed region and increasing the second size of the compressed region, the reducing being by a sufficient number of pages of data so as to make adequate room in the uncompressed region for a requested page of data necessary for continuing execution of the process; and a fourth instruction for storing in the uncompressed region the requested page of data necessary for continuing the execution of the process.

2. A system as recited in claim 1, wherein the third instruction reduces the first size by a factor of a compression ratio that is less than a compression ratio threshold if there are enough page frames in the uncompressed region to be compressed to provide space in which to store the requested page of data in the uncompressed region.

3. A method for managing a computer system process memory allocated to an execution of a process, the process memory having a predetermined size and comprising an uncompressed region having a first size and a compressed region having a second size, the first size and the second size configured to be adjustable, the uncompressed region configured to include uncompressed pages of data and the compressed region configured to include compressed pages of data, the method comprising the operations of:

determining whether a page fault rate of the process memory allocated to the execution of the process exceeds a page fault threshold, the page fault rate representing a fraction of all process memory accesses seeking a page of data, wherein the page of data does not reside in either the uncompressed region or the compressed region of the process memory, the page fault threshold being a preset reference with respect to the page fault rate;

if the page fault rate exceeds the page fault threshold, determining whether a miss rate in the uncompressed region is less than a miss rate threshold, the miss rate being a fraction of all process memory accesses to the process memory seeking a specific page not residing in the uncompressed region of the process memory, the miss rate threshold being a preset reference with respect to the miss rate;

if the miss rate is less than the miss rate threshold, reducing the first size of the uncompressed region and increasing the size of the compressed region, the reducing being by compressing a number of uncompressed pages from the uncompressed region and storing a number of compressed pages in the compressed region, the number of uncompressed pages being such that upon compression such number of uncompressed pages provide adequate space in the uncompressed region for storing a new requested page necessary for the execution of the process; and storing the new requested page in the uncompressed region.

4. A method as recited in claim 3, wherein a compressed page of data is an uncompressed page of data having been compressed by a factor of a compression ratio and the compression ratio is such that the compression of such number of uncompressed pages at the compression ratio provides adequate space in the uncompressed region for storing the new requested page necessary for the execution of the process.

5. A method as recited in claim 3, the method further comprising the operations of:

determining a compression ratio associated with the compressing; and determining a determined number of uncompressed pages of data to be compressed using the compression ratio; and wherein:

the reducing operation reduces the first size of the uncompressed region by compressing the determined number of uncompressed pages of data in the uncompressed region if the number of uncompressed pages of data in the uncompressed region is equivalent to or greater than the determined number of uncompressed pages; and increasing the second size of the compressed region by compressing the determined number of uncompressed pages of data in the uncompressed region if the number of uncompressed pages of data in the uncompressed region is equivalent to or greater than the determined number of uncompressed pages of data; and copying the requested page of data into the uncompressed region.

6. A method as recited in claim 3, the method further comprising the operations of:

determining a compression ratio associated with the compressing;

determining a selected number of compressed pages of data to be swapped to a storage using the compression ratio;

wherein:

if the page fault rate determining operation determines that the page fault rate does not exceed the page fault threshold, determining whether the miss rate in the uncompressed region is less than the miss rate threshold;

if the miss rate is less than the miss rate threshold, reducing the first size of the uncompressed region and increasing the second size of the compressed region, the reducing being by compressing an uncompressed number of pages from the uncompressed region and storing the compressed pages in the compressed region, the uncompressed number of pages being such that upon compression such uncompressed number of pages release a sufficient amount of space in the uncompressed portion for the new requested page to be copied to the uncompressed region;

reducing the second size of the compressed region by swapping the selected number of compressed pages from the compressed region to the storage; and performing the storing operation by copying the new requested page of data into the uncompressed region.

7. A method for dynamically managing partitioning of a computer system process memory allocated to execution of a process using data stored to a storage, data being stored to storage in a page frame format, the allocated process memory configured to have a predetermined size partitioned to an uncompressed region and a compressed region each having an adjustable size, the method comprising the operations of:

(a) commencing execution of the process;

(b) receiving a request for a page frame to continue the execution of the process;

(c) copying a requested page frame to the process memory if the requested page frame does not reside in the process memory;

(d) repeating operations (b) and (c) until the process memory is filled to the predetermined size;

(e) partitioning the allocated process memory to an uncompressed region and a compressed region, the uncompressed region having a first size and the compressed region having a second size, the first size and the second size configured to be adjustable;

(f) determining whether a page fault rate of the process memory allocated to the execution of the process exceeds a page fault threshold, the page fault rate representing a fraction of all process memory accesses seeking a page of data, wherein the page of data does not reside in either the uncompressed region or the compressed region of the process memory, the page fault threshold being a preset reference with respect to the page fault rate;

(g) if the page fault rate does not exceed the page fault threshold, determining whether a miss rate in the uncompressed region is less than a miss rate threshold, the miss rate being a fraction of all process memory accesses to the process memory seeking a specific page not residing in the uncompressed region of the process memory, the miss rate threshold being a preset reference with respect to the miss rate;

(h) if the miss rate is less than the miss rate threshold, reducing the first size of the uncompressed region and increasing the size of the compressed region, the reducing being by compressing a number of uncompressed pages from the uncompressed region, the number of uncompressed pages being greater than a number of compressed pages that increase the second size of the compressed region so that the uncompressed region of the process memory has enough space for the next requested page frame;

(i) if the page fault rate does exceed the page fault threshold, determining whether a miss rate in the uncompressed region is less than a miss rate threshold, the miss rate being a fraction of all process memory accesses to the process memory seeking a specific page not residing in the uncompressed region of the process memory, the miss rate threshold being a preset reference with respect to the miss rate; and (j) if the miss rate in operation (i) is less than the miss rate threshold, reducing the first size of the uncompressed region and increasing the size of the compressed region, the reducing being by compressing a number of uncompressed pages from the uncompressed region, the number of uncompressed pages being greater than a number of compressed pages that increase the second size of the compressed region so that the uncompressed region of the process memory has enough space for the next requested page frame.

8. A method as recited in claim 7, the method further comprising the operations of:

(k) increasing the second size of the compressed region of the process memory by compressing a predetermined number of page frames in the uncompressed region of the process memory if the uncompressed region of the memory lacks enough space for the requested page frame and the uncompressed region of the process memory includes at least a predetermined number of page frames;

(l) if the miss rate is greater than the miss rate threshold, determining whether there are at least a minimum number of page frames in the compressed region to be victimized; and (m) if the determination is that there are at least the minimum number, victimizing at least the minimum number of page frames from the compressed region so that the uncompressed region of the process memory has enough space for the next requested page frame.

9. A method as recited in claim 8, the method further comprising the operations of:

(n) if the determination in operation (l) is that there is less than the minimum number of page frames in the compressed region to be victimized, requesting more process memory so that the uncompressed region of the process memory has enough space for the next requested page frame.

* * * * *